US006392325B2

(12) United States Patent
Fujii et al.

(10) Patent No.: US 6,392,325 B2
(45) Date of Patent: *May 21, 2002

(54) COMMUTATEUR OF IMPROVED SEGMENT JOINABILITY

(75) Inventors: Shinichi Fujii; Hirotaka Kato, both of Obu; Takahiro Harada, Tokyo-to; Haruyuki Ota, Tokyo-to; Seiji Onozaki, Tokyo-to, all of (JP)

(73) Assignees: Aisan Kogyo Kabushiki Kaisha, Obu; Harada Manufacturing Co., Ltd., Tokyo, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/284,467

(22) PCT Filed: Aug. 21, 1998

(86) PCT No.: PCT/JP98/03710

§ 371 Date: Apr. 20, 1999

§ 102(e) Date: Apr. 20, 1999

(87) PCT Pub. No.: WO99/10968

PCT Pub. Date: Apr. 3, 1999

(30) Foreign Application Priority Data

Aug. 21, 1997 (JP) ............................................ 9-225090

(51) Int. Cl.[7] ......................... H02K 13/04; H01R 43/08

(52) U.S. Cl. ....................... 310/234; 310/235; 310/237; 29/597

(58) Field of Search ................................ 310/233, 234, 310/235, 236, 237; 29/597

(56) References Cited

U.S. PATENT DOCUMENTS 4,226,917 A * 10/1980 Tsuruoka et al. ........... 428/614
4,358,319 A * 11/1982 Yoshida et al. ............... 75/200
4,603,474 A * 8/1986 Gobrecht et al. ............. 29/597
5,157,299 A * 10/1992 Gerlach ....................... 310/237
5,175,463 A 12/1992 Farago et al. ............... 310/237
5,316,987 A * 5/1994 Yasutomi et al. ............. 501/97
5,378,417 A * 1/1995 Yasutomi et al. ............. 264/61
5,400,496 A 3/1995 Kremmner et al. ........... 29/597
5,789,842 A * 8/1998 Steinbach et al. .......... 310/233
5,793,140 A 8/1998 Tuckey ....................... 310/237
5,925,961 A * 7/1999 Sugiyanma ................. 310/237
5,932,949 A * 8/1999 Ziegler et al. .............. 310/236
5,980,822 A * 11/1999 Moon et al. ................ 420/561
5,996,210 A * 12/1999 Konig ......................... 29/597

FOREIGN PATENT DOCUMENTS

| | | |
|---|---|---|
| JP | 2-26880 | 1/1990 |
| JP | 5-502974 | 5/1993 |
| JP | 7-298560 | 11/1995 |
| JP | 8-65966 | 3/1996 |
| JP | 9-154261 | 6/1997 |
| JP | 9-182381 | 7/1997 |

* cited by examiner

*Primary Examiner*—Nestor Ramirez
*Assistant Examiner*—Dang Dinh Le
(74) *Attorney, Agent, or Firm*—Dennison, Schultz & Dougherty

(57) ABSTRACT

A metallic ring 45 molded by punching a copper plate having hooks 43, etc., and a carbon member 46 are brazed to each other by a brazing material having a higher melting point than the temperature for connecting a coil to conductive members 52, that is, a brazing material containing, for example, nickel and chromium. Next, resin is filled up inside the metallic ring 45 and carbon member 46 to form a resin substrate 48. Next, slits 50 are formed at the metallic ring 45 and the carbon member 46 in the radial direction, so that generally fan-shaped segments 51 insulated from each other and conductive members 52 are formed. Next, a coil is connected to hooks 43 of the conductive members 52 by soldering, welding, etc.

34 Claims, 12 Drawing Sheets

COMMUTATEUR OF IMPROVED SEGMENT JOINABILITY

TECHNICAL FIELD

The present invention relates to a commutator for a rotor, and more particularly, to a commutator preferably used in an electro-drive type fuel pump.

BACKGROUND ART

A known electro-drive type fuel pump for an in-tank system is installed in a fuel tank. In such an electro-drive type fuel pump of an in-tank system, a commutator formed of copper, silver, etc., is used. However, if such a commutator is used in a mixed fuel system containing alcohol, it may react with the fuel and may corrode, and deterioration thereof is accelerated.

Therefore, a commutator made of carbon has been proposed. Carbon has better corrosion-resisting properties and a long service life. Because carbon has self-lubricating properties, satisfactory operation with brushes can be achieved. FIG. 2 is a plan view showing one example of a flat type commutator that is formed of carbon and FIG. 3 is a perspective view thereof. As shown in FIGS. 2 and 3, the flat type commutator comprises a plurality of radially disposed segments 31 that have a generally fan-shaped configuration, conductive members 32, each electrically connected to the respective segments 31 and formed from a conductive material such as copper, and an insulative resin-made substrate 30 for supporting the segments 31 and the conductive members 32.

Each of the segments 31 is formed by compressing and molding carbon powder and by thermally treating the segments 31. Further, a hook 33 that connects a coil of an armature 7 is formed on the conductive members 32. The resin-made substrate 30 is formed at the center of the axis of rotation of the segments 31. An axial hole 35, into which the armature (rotor) shaft of a motor is fitted, is formed in the resin-made substrate 30 at the center axis of rotation. Each of the segments 31 and conductive members 32 are insulated from other segments 31 and conductive members 32 by slits 34 formed in the radial direction.

A method for producing such a commutator made of carbon is disclosed in U.S. Pat. Ser. No. 5,175,463. In this fabrication method, the surface of a ring-like carbon member having a parallel surface is first treated so that a metallic ring may be joined thereto. This metallic ring is made of a conductive material, such as copper, and is attached to the surface of the ring-like carbon member by soldering. The commutator is filled with resin to form a resin substrate that supports the carbon member and the metallic ring. Slits 34 are then formed in the carbon member and the metallic ring in the radial direction in order to divide the carbon member and the metallic ring into sections, so that the segments 31 and the conductive members 32 are formed. Subsequently, an armature (rotor) coil is connected to the conductive member 32 by soldering or welding.

In this fabrication method, because the carbon member and the metallic ring are joined together by soldering, the solder can sometimes melt, due to the heat that is necessary to connect the coil, whether by soldering or welding, to the conductive members that are formed by dividing the metallic ring. The bonding strength between the segments, which are created by dividing the carbon member and the conductive member, decreases as the solder melts. Thus, the segments may separate from the conductive member, and conductivity may be diminished.

DISCLOSURE OF THE INVENTION

It is, accordingly, an object of the invention to prevent the bonding strength between the carbon member and the conductive member from decreasing and to improve conductivity by reducing differences in the thermal expansion coefficients between the conductive member and the segments, even though heat is utilized to connect a coil to the conductive members, and by improving the bonding strength between the segments and the conductive members.

With the invention, the segments (carbon member) and the conductive member (metallic ring) are brazed together with a brazing material that does not melt from the heat applied when connecting the coil to the conductive member. For example, a brazing material including nickel and chromium may be used as the brazing material. Thus, the heat generated in connecting the coil to the conductive member does not melt the brazing material.

The contact area between the segments and the conductive members also is decreased. Further, the firing temperature of the segments is higher than the melting point of the brazing material, so as to prevent the segments from cracking when cooling the brazing material.

The present invention will be better understood by reading the description of preferred embodiments described below with reference to the accompanying drawings or reading the scope of claims.

BEST MODES FOR CARRYING OUT THE INVENTION

First Preferred Embodiment

Figure 1:
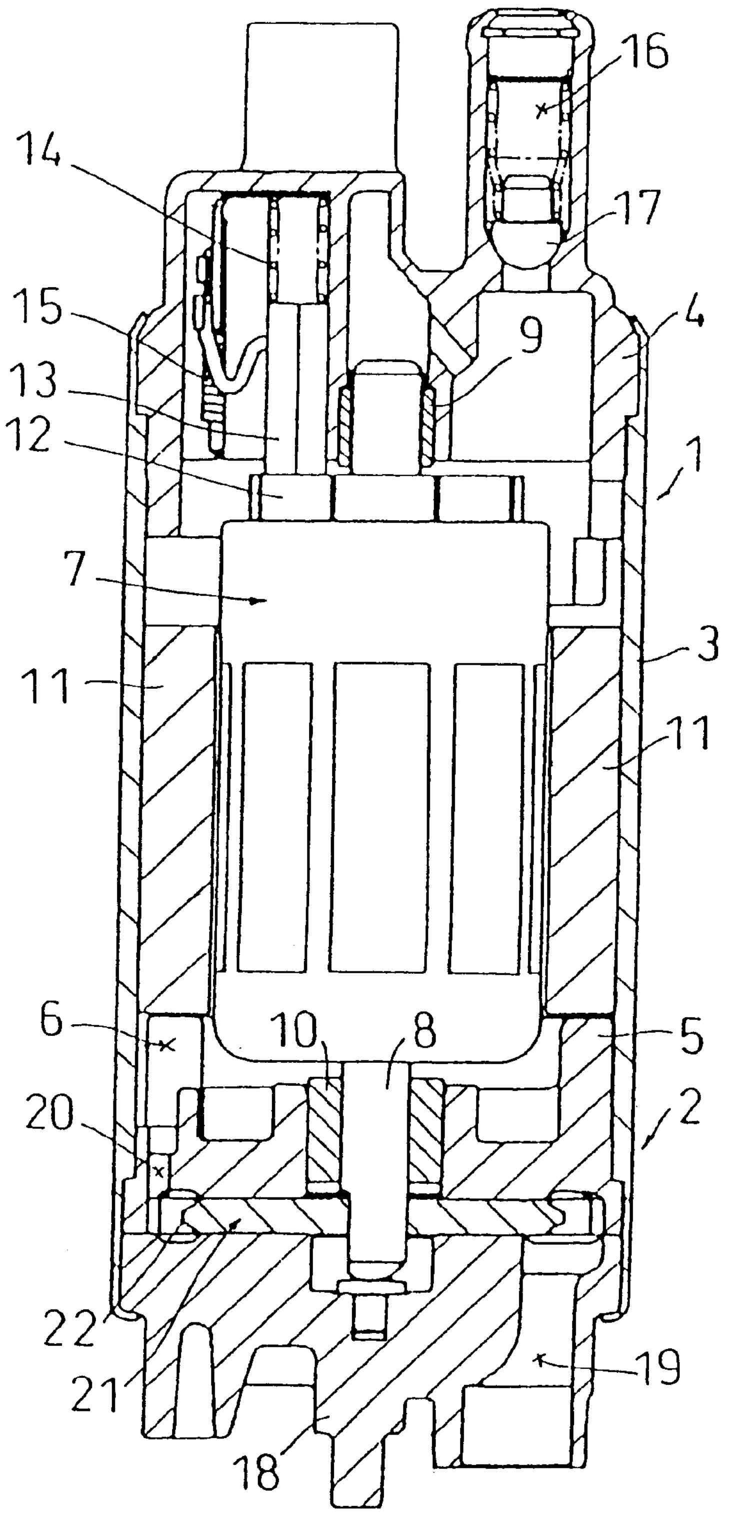
FIG. 1 is an outline view of an electro-drive type fuel pump.
Figure 2:
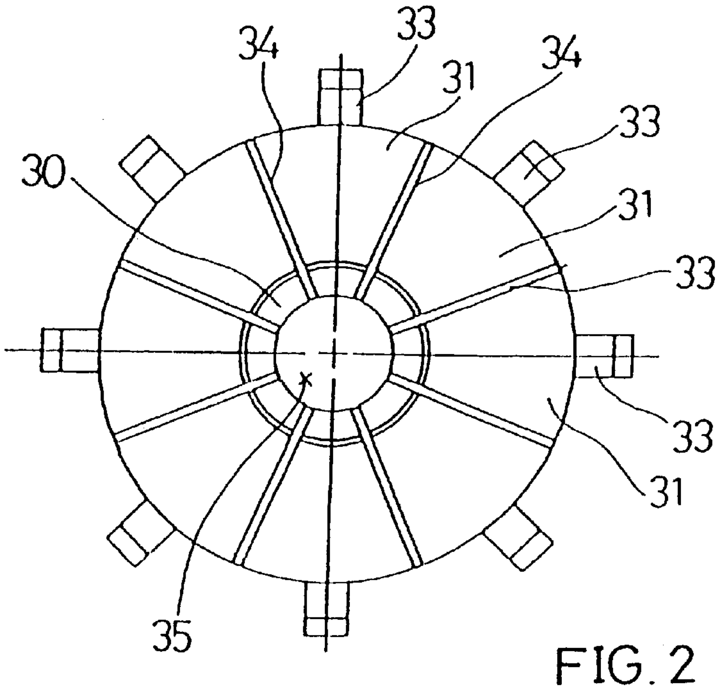
FIG. 2 is a plan view showing a commutator formed of carbon.
Figure 3:
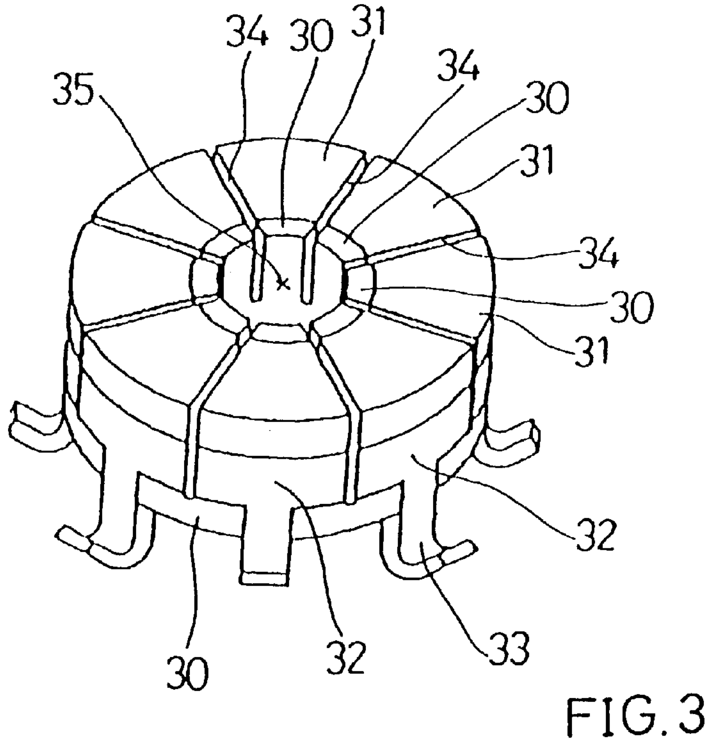
FIG. 3 is a perspective view showing a commutator formed of carbon.

FIG. 1 shows one example of an electro-drive type fuel pump of in-tank system that is provided in a fuel tank.

An electro-drive type fuel pump illustrated in FIG. 1 comprises a motor section 1 that is incorporated within a cylindrically formed housing 3, and a pump section 2 that is incorporated below the housing 3. A motor cover 4 is attached to the upper end of the housing 3 and a pump cover 5 is attached to the lower end thereof. The upper and lower ends of a shaft 8 are supported at the motor cover 4 and the pump cover 5 by bearings 9 and 10, so that an armature 7 is rotatably disposed within a motor chamber 6. A magnet 11 is disposed on the inner circumferential wall of the housing 3. A plurality of commutators 12 connected to a coil are disposed on the armature 7 and are insulated from each other. The motor cover 4 includes a brush 13, which can slidingly contact the commutators 12 of the armature 7, and a spring 14 that biases the brush 13. The brush 13 is connected to an external connection terminal via a choke coil 15. A fuel supply pipe is connected to a check valve 17 that is incorporated in a discharge port 16 and is secured to the motor cover 4. Further, on the underside of the pump cover 5, a pump body 18 is attached to the lower end part of the housing 3 by caulking. A fuel inlet port 19 is provided in the pump body 18. A fuel outlet port 20 is provided in the pump cover 5. A disk-shaped impeller 21 having a number of blade grooves 22 formed in the circumferential direction is disposed in the pump chamber formed by the pump body 18 and the pump cover 5. The impeller 21 is fitted onto and connected to the armature shaft 8.

In such an electro-drive type fuel pump, the impeller 21 is driven and rotated by supplying an electric current to the motor section 1, which rotates the axis of the armature 7. Thus, fuel in the fuel tank is suctioned through the inlet port 19 and is supplied to the motor chamber 6 through the outlet port 20, so that the fuel is discharged from the discharge port 16 into a fuel supply pipe.

A description will now be given of a first preferred embodiment of a commutator according to the invention with reference to FIGS. 4 through 9. It will be noted in the specification that segments formed by sectioning a carbon member are called "segments," and members formed by sectioning a metallic ring arc called "conductive members."

Figure 4:
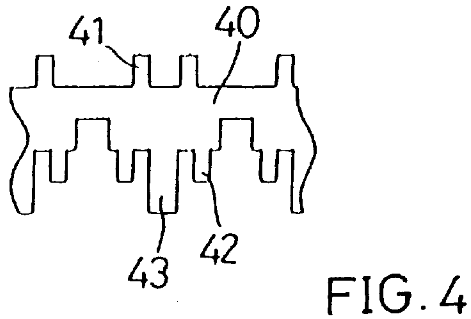
FIG. 4 is a view showing a metallic plate used to produce a commutator according to a first preferred embodiment of the invention.

First, as shown in FIG. 4, a conductive metallic plate is punched and has a body section 40, claws (retaining members) 41 and 42 to retain a resin substrate, and a hook 43 for connecting to a coil. Preferably, a metallic plate is used that is made of copper or a copper alloy having a higher conductivity.

Figure 5:
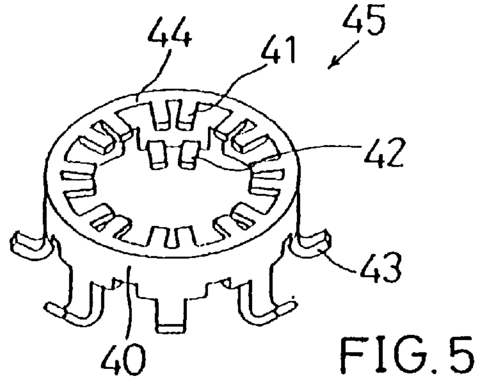
FIG. 5 is a view showing a metallic ring formed of a metallic plate illustrated in FIG. 4.

As shown in FIG. 5, the body section 40 of the metallic plate is then curled into a cylindrical shape. Metallic ring 45 is formed by folding the claws 41 and 42 towards the center of the cylindrical body section and by folding the hook 43 outward thereof. If the metallic plate is made of copper or a copper alloy, the curling of the body section 40 and the folding of the claws 41 and 42 is further improved.

Figure 6:
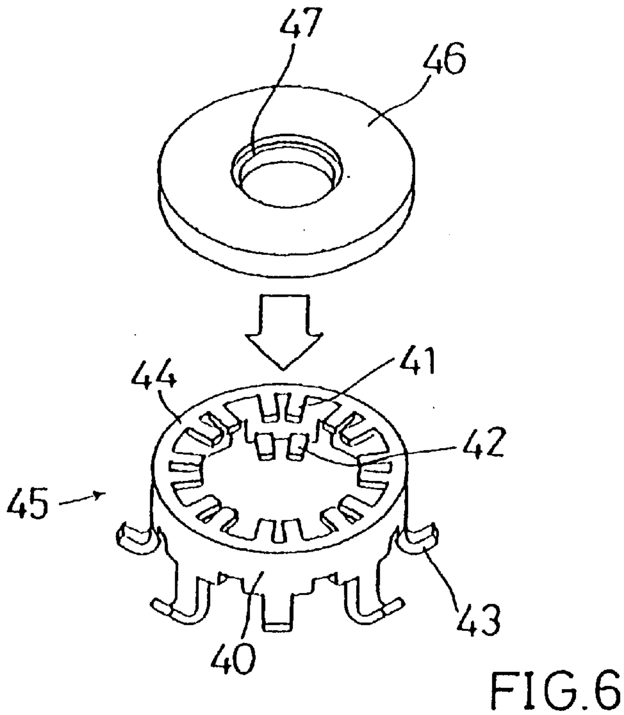
FIG. 6 is a view showing a state in which a carbon member is joined to the metallic ring illustrated in FIG. 5.
Figure 7:
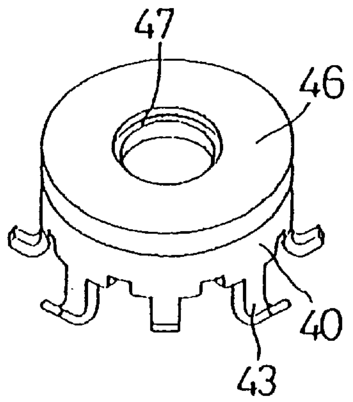
FIG. 7 is a view in which a carbon member is joined to the metallic ring illustrated in FIG. 5.

As shown in FIGS. 6 and 7, a disk-shaped carbon member 46 is formed from carbon powder that is compressed molded and heat-treated and is joined to the metallic ring 45 by brazing.

Titanium (Ti) and chromium (Cr) may be used as a brazing material to provide good bonding characteristics with the carbon material that forms the carbon member 46. Further, chromium reacts with carbon to form chrome carbide, which is an inter-metallic compound. However, because titanium can be easily oxidized, it can be only brazed in a vacuum or in an inert gas atmosphere. As a result, production costs using titanium are increased, and it is not suitable for mass production. Therefore, chromium is preferable as a brazing material that has good bonding characteristics with the carbon materials. 46. Moreover, gold (Au), silver (Ag), copper (Cu), titanium (Ti), and nickel (Ni) also may be utilized as brazing materials that have good bonding characteristics with the copper and copper alloy that forms metal ring 45. However, titanium (Ti) alone is not suitable for the reason mentioned above.

An investigation was made with respect to the bonding properties of mercury, copper, nickel, and chromium, and resulted in a finding that the bonding properties between nickel and chromium were better than the bonding properties between mercury, copper and chromium. Further, as will be described below, in order to prevent the bonding properties between the segments (carbon member) and the conductive material (metallic rings) from deteriorating, due to the heat that is applied when connecting the coil to the conductive member, the melting point of the brazing material should be higher than the temperature that the brazing material reaches from the heat absorbed when connecting the coil to the conductive member. If the melting point of the brazing material is higher than the soldering or welding temperature (for example, approx. 1,000 C), this condition is satisfied. Therefore, a brazing material containing nickel and chromium is preferable as the brazing material to join the carbon member 46 and the metallic rings 45.

However, if the thermal expansion coefficient of the carbon member 46 is different from the thermal expansion coefficient of the brazing material, cracks, etc., are likely to form in the carbon member 46 when the brazing material cools. However, because the difference in the thermal expansion coefficient between chromium used in the brazing material and the carbon member 46 is small (i.e., the thermal expansion coefficient of chromium is $8.4\times10^{-6}$/C, and the thermal expansion coefficient of carbon is $7\times10^{-6}$/C), stress in the carbon member 46, which results from a difference in the thermal expansion efficient between the carbon material 46 and the brazing material, is insignificant as the brazing material cools after the brazing step is completed. Therefore, it is possible to prevent the carbon member 46 from cracking, etc., when the brazing material cools. In this aspect, it is advantageous to use a brazing material containing chromium.

It is also necessary that the brazing temperature is less than the melting point of the metallic rings 45. In the preferred embodiment, a brazing material, JIS Z 3265 BNi-7 (Japanese Industrial Standards) containing chromium, of which the major constituent is nickel, was used as brazing material because it satisfies the above-mentioned conditions.

Figure 30:
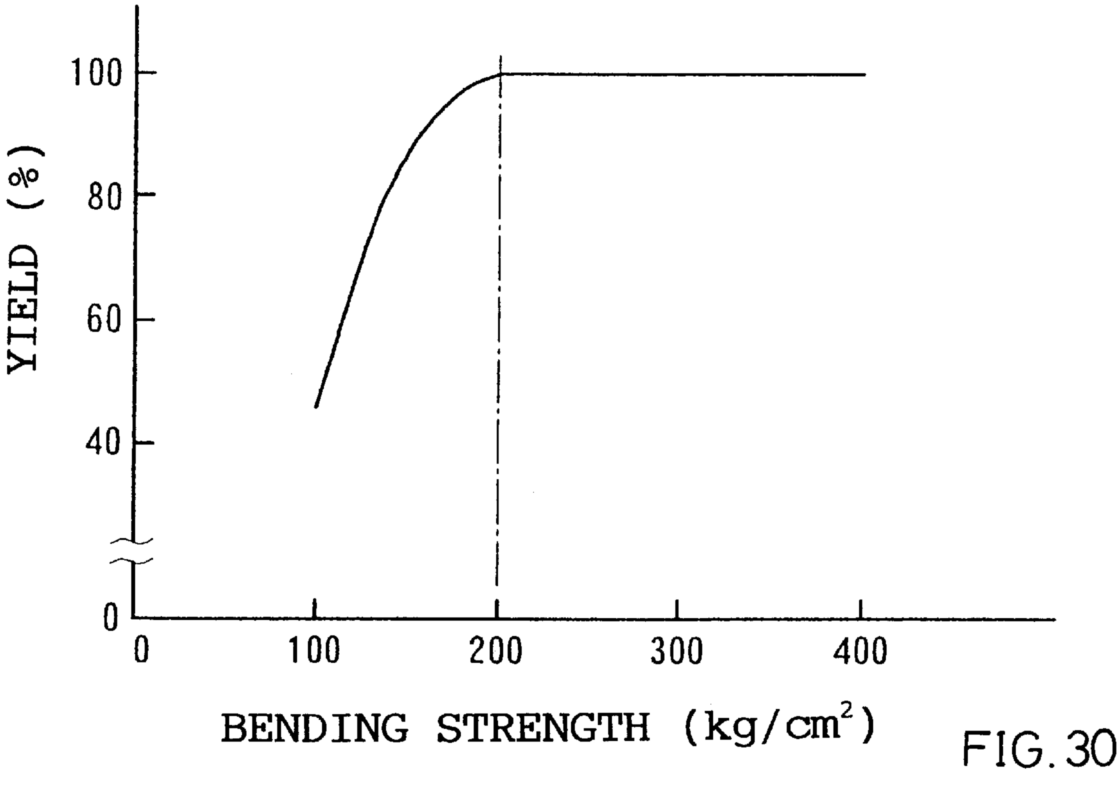
FIG. 30 is a view showing a correlation between the bending strength of the carbon member and the yield (non-defective ratio) of the commutators.

Further, because cracks, etc., are likely to form in the carbon member 46 during the brazing step, if the metallic rings 45 are brazed to a carbon member 46 having a low resistance to bending, the yield (non-defective ratio) of commutators produced is reduced. FIG. 30 shows a correlation between the bending strength of the carbon member and the yield of commutators if brazing is performed with a brazing material containing nickel and chromium. As shown in FIG. 30, if the bending strength of the carbon member is less than 200 kg/cm$^2$, the yield decreases. Therefore, the carbon member preferably has a bending strength of 200 kg/cm$^2$ or more.

Further, if the brazing temperature is higher than the firing temperature of carbon member 46, cracks, etc., are likely to form in carbon member 46 during the brazing step. Therefore, the firing temperature of the carbon member 46 is preferably higher than the brazing temperature. For example, carbon having a firing temperature that is higher than the melting point of a brazing material is used. Alternatively, a brazing material having a lower melting point than the firing temperature of the carbon member is used.

If carbon member 46 is brazed to the metallic ring 45 as illustrated in FIG.5, the brazing surface area of the carbon member 46 is small, because the end face of the metallic rings 45, i.e., the plate thickness face 44, is brazed. Thus, stress in the carbon member 46, which may be generated by a difference in the thermal expansion coefficients of carbon member 46 and the brazing material when the brazing material cools, is reduced, and it is possible to prevent cracks, etc., from forming in carbon member 46.

Figure 8:
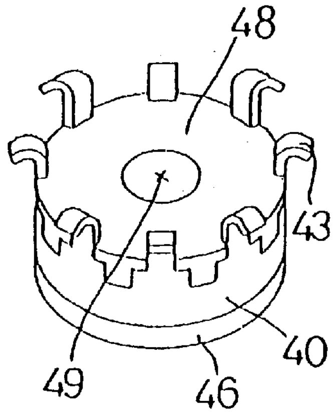
FIG. 8 is a view in which the metallic ring and the carbon member illustrated in FIG. 7 are integrated with a resin substrate.

As shown in FIG. 8, the metallic rings 45 and the carbon members 46 are filled with resin to form a resin substrate 48 that supports the metallic rings 45 and the carbon members 46. At this time, a fitting hole 49 is opened and the armature axis 8 is fitted into the center of the rotational axis of the resin substrate 48. Because claws 41 and 42 are formed on the metallic rings 45 as retaining members that retain the resin substrate 48, the metallic rings 45 are firmly supported by the resin substrate 48. Further, a stepped portion 47 is formed in the carbon members 46, such that the stepped portion 47 forms an anchoring portion for the resin substrate 48. Thus, the carbon members 46 are firmly supported on the resin substrate 48 by the anchoring portion that is formed in the stepped portion 47.

Figure 9:
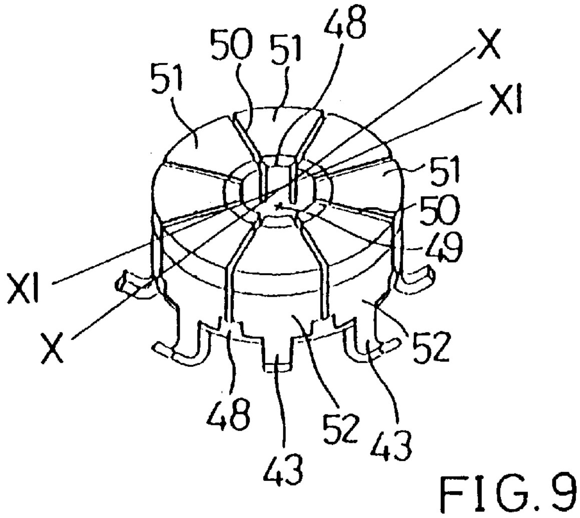
FIG. 9 is a view showing a commutator according to the first preferred embodiment of the invention.

As shown in FIG. 9, slits 50 are formed at the carbon members 46 and the metallic rings 45 in the radial direction, so that they are insulated from each other. A plurality of generally fan-shaped and radially disposed segments 51 and a plurality of conductive members 52, each joined to the respective segments 51, are formed.

A coil is connected to the hook 43 of the conductive members 52 by soldering, welding, etc. Because the conductive members 52 are formed of a metallic plate made of copper or copper alloy, the thermal conductivity is good, and the coil can be easily connected by welding.

Figure 10:
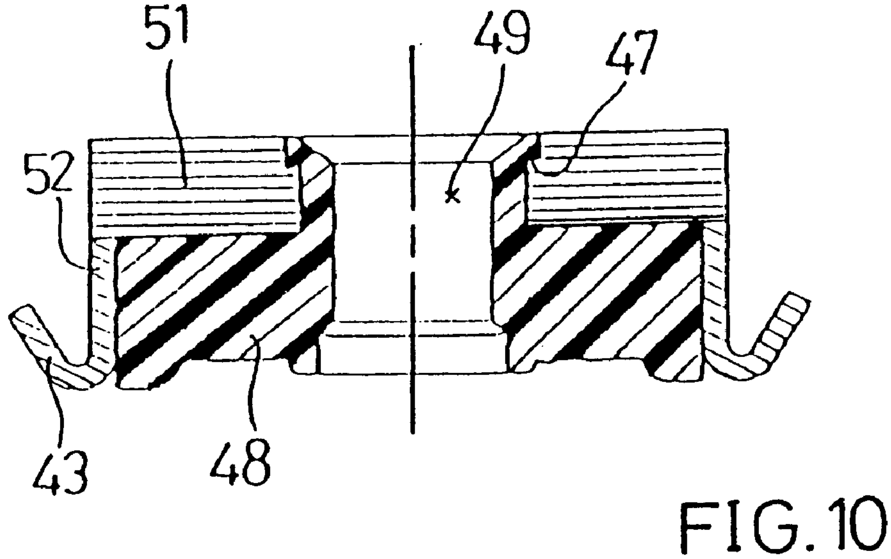
FIG. 10 is a cross-sectional view taken along the line X—X in FIG. 9.
Figure 11:
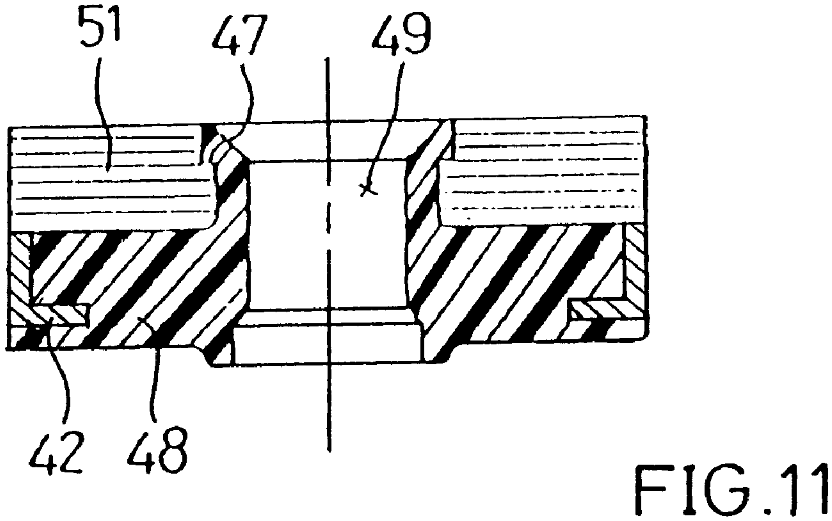
FIG. 11 is a cross-sectional view taken along the line XI—XI in FIG. 9.

FIG. 10 is a cross-sectional view taken along the line X—X in FIG. 9, and FIG. 11 is also a cross-sectional view taken along the line XI—XI in FIG. 9.

As described above, because a brazing material having good bonding properties between the carbon members 46 and the metallic rings 45 is used as the brazing material to braze together the carbon members 46 and the metallic rings 45, it is not necessary to form any metal film, such as a plating, on the carbon members 46. As a result, fabrication is simplified. In addition, because the melting point of the brazing material is high, the brazing material will not melt due to the heat applied to the brazing material when connecting the coil to the hooks 43 of the conductive member 52 by soldering, welding, etc. As a result, the bonding strength between the segments 51 and the conductive member 52 is not decreased. Further, because the carbon members 46 and the metallic rings 45 are joined together before forming the resin substrate 48, carbon having a high firing temperature may be used. Therefore, the resistance of the carbon members 46 can be reduced, thereby reducing power loss. Still further, it is possible to prevent cracks, etc., from forming in the carbon members 46 as a result of the heat applied to the carbon member when the carbon members 46 are brazed.

Figure 12:
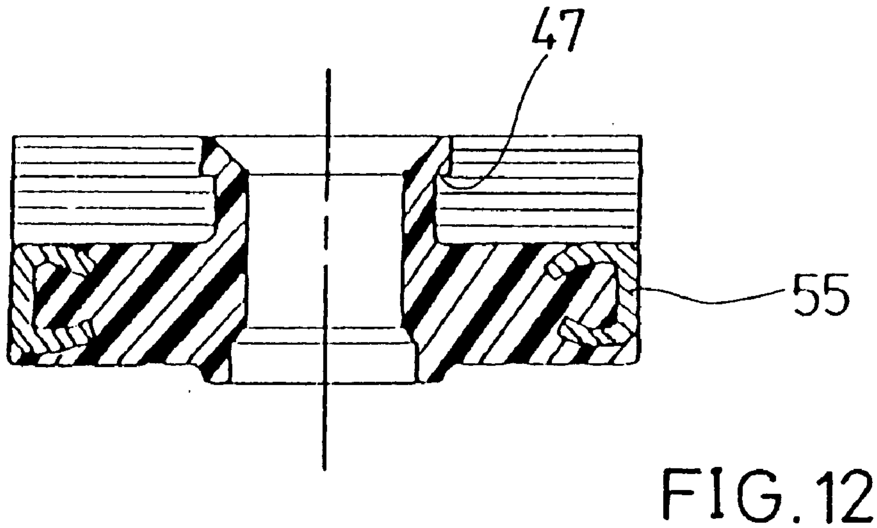
FIG. 12 is view showing another example of a claw of the metallic ring.

Further, the number of retaining members (claws 41 and 42) for retaining the resin substrate and installation place thereof may be appropriately changed, and the retaining members may be omitted. Further, the shape of the retaining members (claws 41 and 42) may modified in various ways. For example, as shown in FIG. 12, retaining members 55 having a C-shaped cross section may be used. Also, the supporting member is not limited to a resin substrate in order to support the segments (carbon members) and the conductive members (metallic rings). The shape, position, etc., of the stepped portion 47 formed on the carbon members 46 may be appropriately modified, and indeed the stepped portion 47 may-be omitted.

Figure 13:
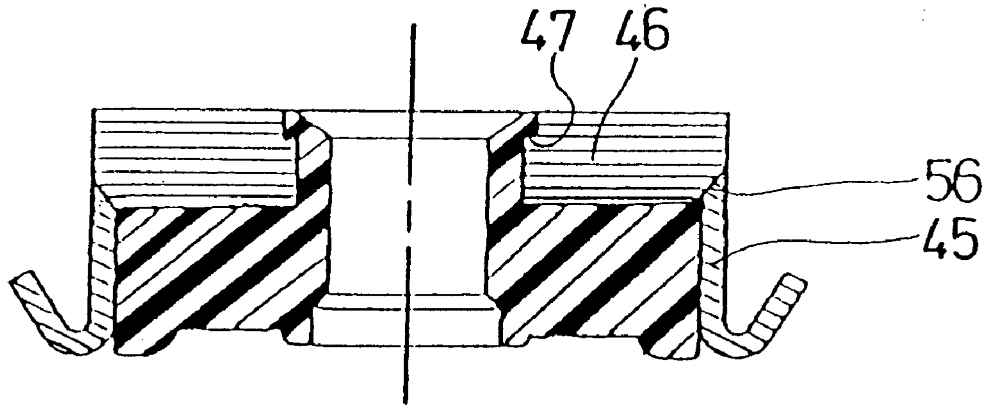
FIG. 13 is a view showing a construction for positioning the metallic ring and the carbon member.
Figure 14:
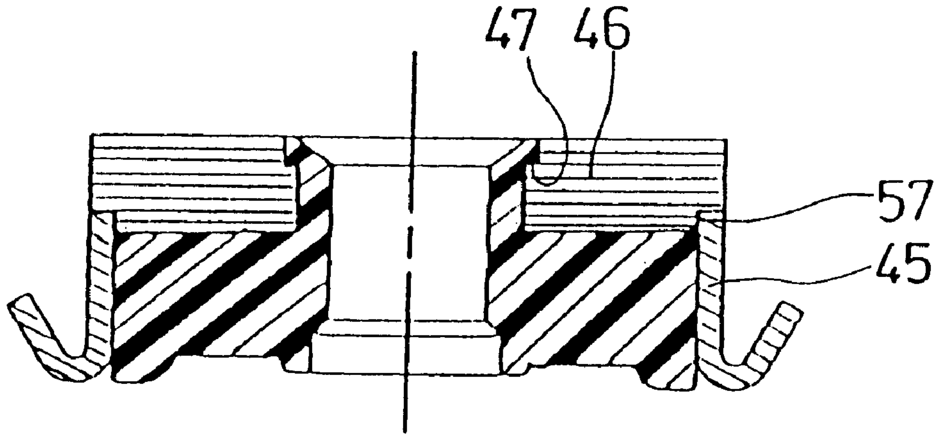
FIG. 14 is a view showing another construction for positioning the metallic ring and the carbon member.

Further, a construction may be utilized that facilitates the positioning of the carbon members 46 and the metallic rings 45. For example, as shown in FIG. 13, a tapered section 56 may be formed, by which the carbon members 46 and the metallic rings 45 can be attached at a position opposed to each other. The carbon members 46 and the metallic rings 45 may be brazed together after positioning at the tapered section 56. Alternatively, as shown in FIG. 14, a groove 57 is formed in the carbon members 46. After the end face of the metallic ring 45 is inserted into the groove 57, and the carbon members 46 and the metallic rings 45 are positioned, the engaging portions may be brazed.

A description will now be given of a second preferred embodiment of the invention with reference to FIGS. 15 through 20. The second preferred embodiment differs from the first embodiment only in the shapes of the metallic rings and the carbon members.

Figure 15:
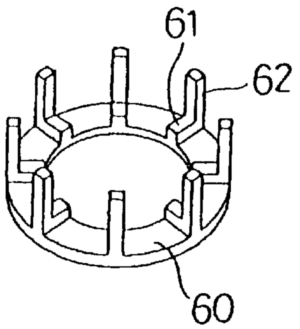
FIG. 15 is a view showing a metallic plate used to produce a commutator according to a second preferred embodiment of the invention.
Figure 16:
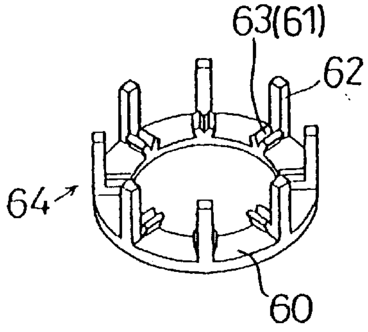
FIG. 16 is a view showing a metallic ring formed from the metallic plate illustrated in FIG. 15.

As shown in FIG. 15, a conductive metallic plate is punched and has a ring-like body section 60, and claw forming portions 61 and hooks 62. Further, the area of the body section 60 is made as small as possible to prevent the carbon members from cracking, etc., due to stress in the carbon members when the brazing material cools. As shown in FIG. 16, the central part of the claw forming portions 61 is divided, so as to form a metallic ring 64 having a claw 63 as a retaining member to retain the resin substrate.

Figure 17:
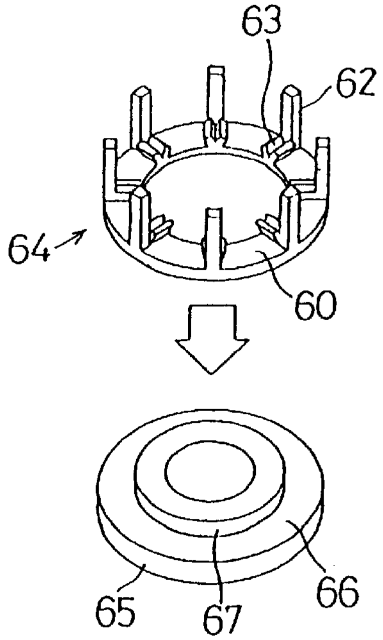
FIG. 17 is a view showing a state in which a carbon member is joined to the metallic ring illustrated in FIG. 15.
Figure 18:
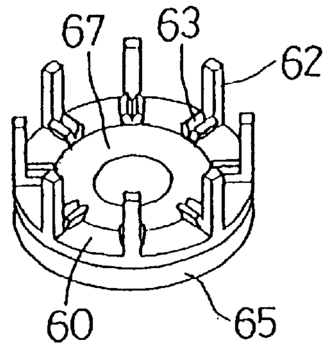
FIG. 18 is a view in which a carbon member is jointed to the metallic ring illustrated in FIG. 15.

Next, as shown in FIGS. 17 and 18, the metallic rings 64 and disk-shaped carbon members 65 are brazed together using a brazing material. A base 66 and a fitting portion 67 are formed at the carbon members 65. By inserting the fitting portion 67 of the carbon members 65 into the inner circumferential hole of the metallic ring 64, the carbon members 65 and the metallic rings 64 can be easily positioned. After the carbon members 65 and the metallic rings 64 are positioned, the opposing portions of the body section 60 of the metallic rings 64 and the base 66 of the carbon members 65 are brazed and joined together.

Figure 19:
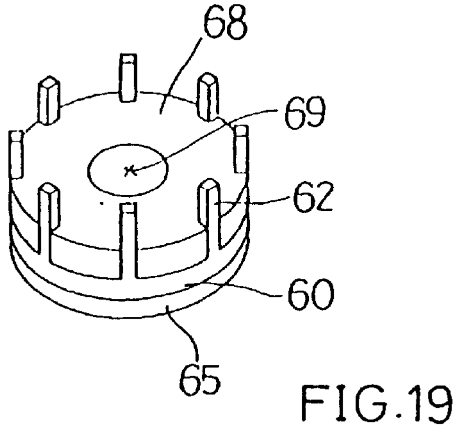
FIG. 19 is a view in which the metallic ring and the carbon member illustrated in FIG. 18 are integrated with a resin substrate.

As shown in FIG. 19, the metallic rings 64 and the carbon members 65 are filled with resin, thus forming a resin substrate 68. At this time, a fitting hole 69 is opened, and the armature axis 8 is fitted inside along the center of rotational axis of the resin substrate 68. Further, a stepped portion 47, which is similar to that in the first preferred embodiment, is formed in the carbon members 65. Thus, the metallic rings 64 are firmly retained in the resin substrate 68 by the claw 63 and the carbon members 65 are firmly retained by the anchoring portion of the resin substrate formed in the stepped portion 47.

Figure 20:
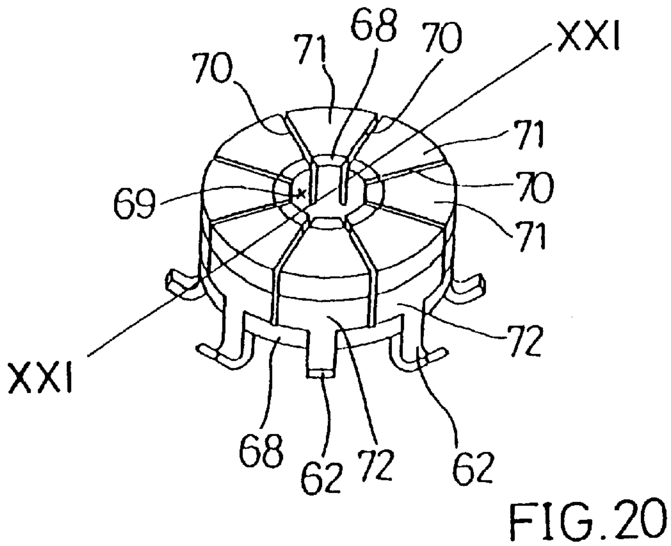
FIG. 20 is a view showing a commutator according to the second preferred embodiment of the invention.

As shown in FIG. 20, slits 70 are then formed in the carbon members 65 and the metallic rings 64 in the radial direction, so as to insulate each other and to form a plurality of radially disposed and generally fan-shaped segments 71 and a plurality of conductive members 72 joined to the respective segments 71. Hooks 62 of the conductive members 71 are folded outward, and a coil is connected to hooks 62.

Figure 21:
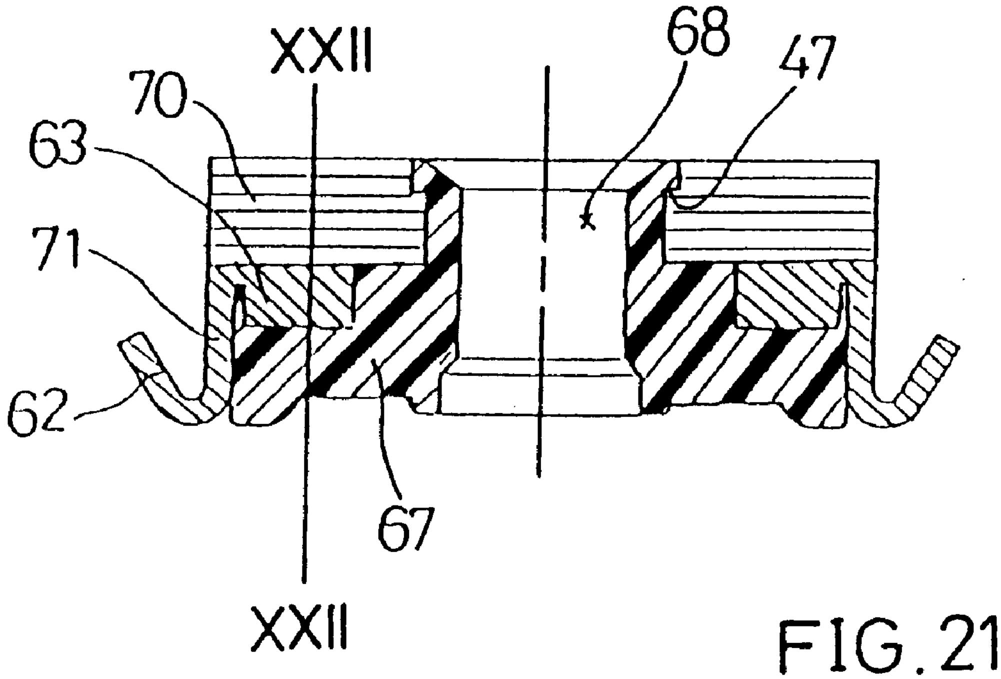
FIG. 21 is a cross-sectional view taken along the line XXI—XXI in FIG. 20.
Figure 22:
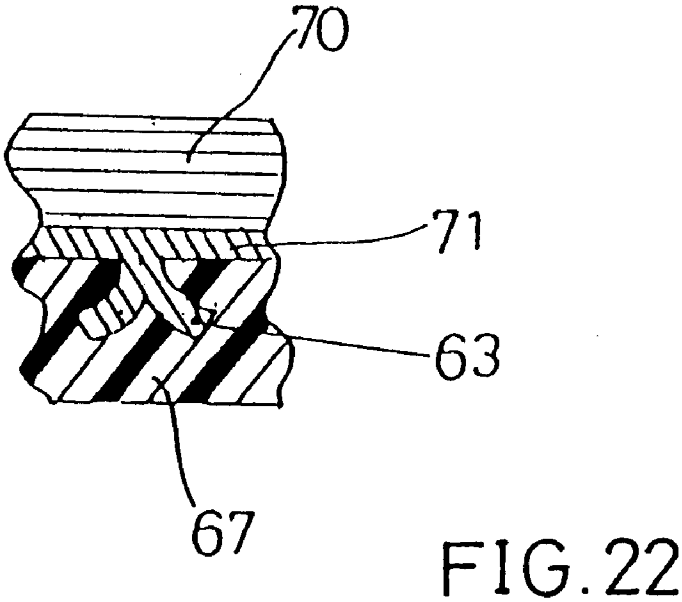
FIG. 22 is a cross-sectional view taken along the line XXII—XXII in FIG. 21.

FIG. 21 shows a cross-sectional view taken along the line XXI—XXI in FIG. 20, and FIG. 22 shows a cross-sectional view taken along the line that XXII—XXII in FIG. 21.

A description will now be given of a third preferred embodiment of the invention with reference to FIGS. 23 through 28. The third preferred embodiment differs from the first and second preferred embodiments only in the shape of the metallic ring and the carbon member.

Figure 23:
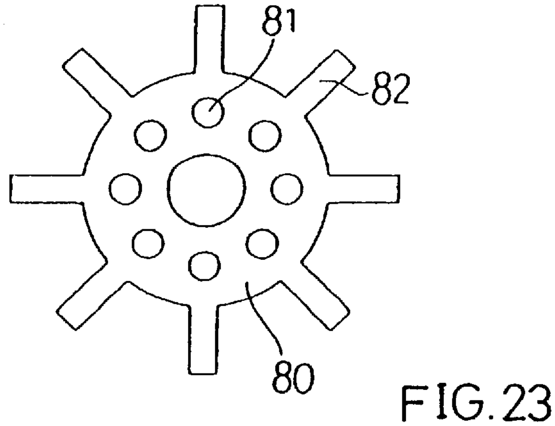
FIG. 23 is a view showing a metallic plate used to produce a commutator according to a third preferred embodiment of the invention.
Figure 24:
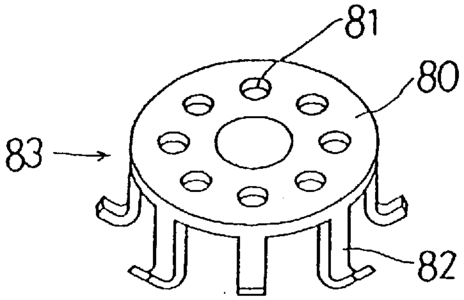
FIG. 24 is a view showing a metallic ring formed from the metallic plate illustrated in FIG. 23.

As shown in FIG. 23, a conductive metallic plate is punched and has a ring-like body section 80, a hole 81, and a hook 82. As shown in FIG. 24, the hook 82 is folded outward to form a metallic ring 83.

Figure 25:
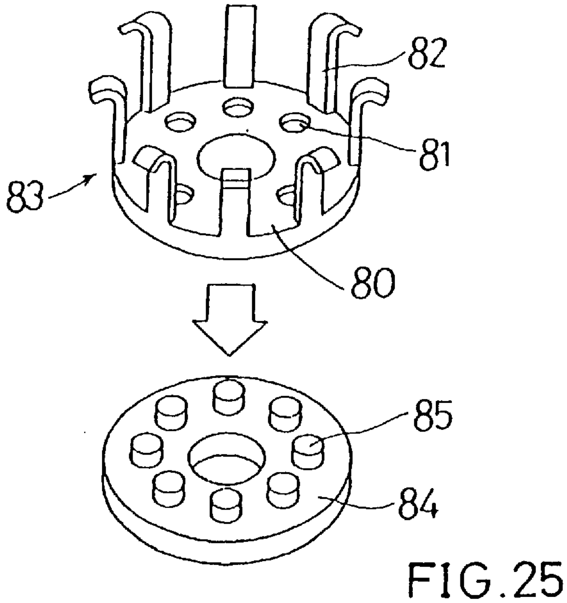
FIG. 25 is a view showing a state in which a carbon member is joined to the metallic ring illustrated in FIG. 24.
Figure 26:
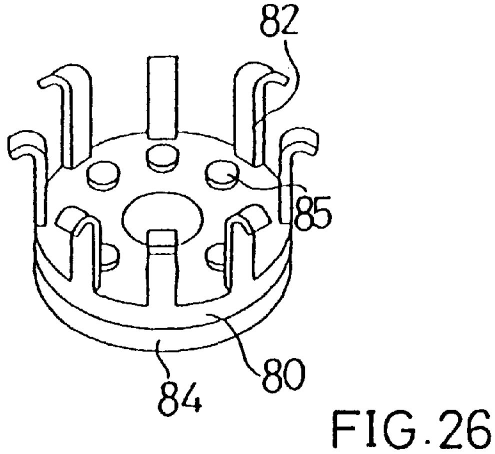
FIG. 26 is a view in which a carbon member is jointed to the metallic ring illustrated in FIG. 23.

Next, as shown in FIGS. 25 and 26, the metallic ring 83 and a disk-shaped carbon member 84 are brazed together using a brazing material containing chromium and nickel, so that a protrusion part 85 is formed on the carbon members 84. By inserting the protrusions 85 of the carbon member 84 into the holes 81 in the metallic ring 83, the carbon member 84 and the metallic ring 83 can be easily positioned. After the carbon member 84 and the metallic ring 83 are positioned, the hole 81 and the protrusions 85 are brazed together. In order to prevent the carbon member 84 from cracking, etc. due to stress in the carbon member 84 when the brazing material cools, the end face of the metallic ring 83 to be brazed, i.e., the circumferential surface of the hole 81, is as small as possible.

Figure 27:
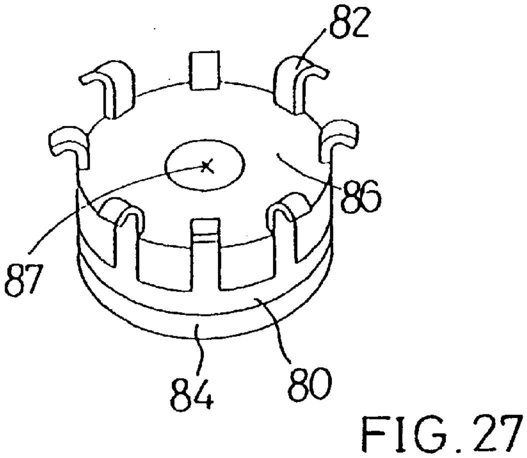
FIG. 27 is a view in which the metallic ring and the carbon member illustrated in FIG. 26 are integrated with a resin substrate.

As shown in FIG. 27, the metallic ring 83 and the carbon member 84 are filled with resin in order to form a resin substrate 86. At this time, a fitting hole 87 is formed, into which the armature axis 8 is fitted along the center of rotational axis of the resin substrate 86. A stepped portion 47 is formed, as in the first preferred embodiment, so that the metallic ring 83 is firmly retained in the resin substrate 86 by the protrusions 85 of the carbon member 84. The protrusions 85 protrude from the hole 81 of the metallic ring 83 while the carbon member 65 is firmly retained at the resin substrate 86 by the anchoring part of the resin substrate, which is formed in the stepped portion 47.

Figure 28:
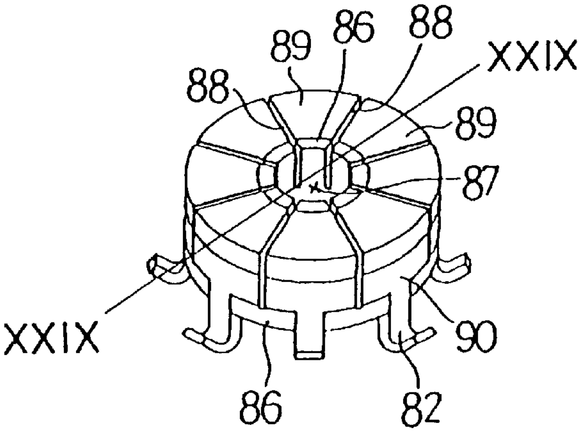
FIG. 28 is a view showing a commutator according to the third preferred embodiment of the invention.
Figure 29:
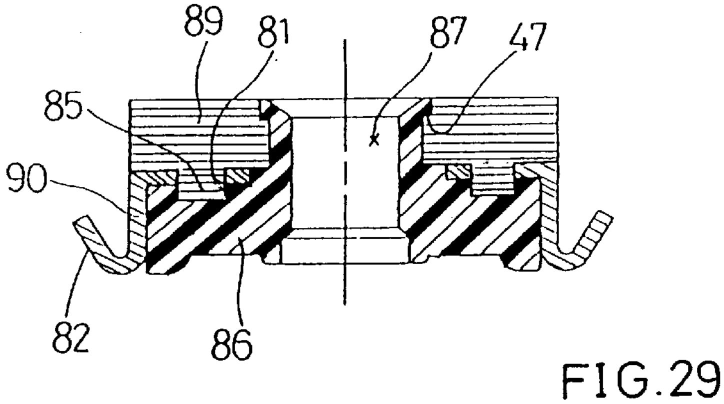
FIG. 29 is a cross-sectional view taken along the line XXIX—XXIX in FIG. 28.

As shown in FIG. 28, slits 88 are formed at the carbon member 84 and the metallic ring 83 in the radial direction, so as to insulate each other, and to form a plurality of radially disposed and generally fan-shaped segments 89, and a plurality of conductive members 90 respectively connected to the respective segments 89. A coil is connected to the hooks 82 of the conductive members 90. FIG. 29 shows a cross-sectional view taken along the line XXIX—XXIX in FIG. 28.

The brazing material used in the present invention is not limited to a brazing material containing nickel and chromium. It also may be a brazing material that does not melt as a result of the heat generated to connect the coil to the conductive members. Thus, the brazing material used in the invention is not limited to a brazing material containing nickel and chromium, and it may be a brazing material in which a difference in the thermal expansion coefficient between the brazing material and the carbon member is small. Further, the shape of the metallic ring and the carbon member, the structure of the brazing portions of the metallic ring and the carbon member, and method thereof, etc. may be modified in various ways.

As described above, in a commutator according to the invention, the bonding strength between the carbon member (segments) and the metallic ring (conductive members) is not reduced, because the brazing material does not melt from the heat applied to the brazing material when connecting a coil to the conductive members. In addition, because a metallic film, such as plating, is not required to be formed on the carbon member, fabrication is simplified and costs can be reduced. Further, because the difference in the thermal expansion coefficients between the brazing material and the carbon member is small, the carbon member can be prevented from cracking, etc., as a result of stress generated after the brazing is finished and as the brazing material cools. Still further, because the metallic ring is configured so that the brazing surface area of the carbon member is reduced, the carbon member can be prevented from cracking from stress when the brazing material cools. Further, because the metallic plate having the metallic ring can be produced by punching, the production is simplified and costs thereof is reduced. Further, because a resin substrate is formed after the carbon member and the metallic ring are adhered together, the firing temperature of the carbon member can be increased. Thus, because the resistance of the carbon member can be decreased, power loss can be reduced. As a result, the carbon member can be further prevented from cracking, etc., from the heat when the carbon member 46 is brazed. A commutator according to the invention is useful, not only for an electro-drive type fuel pump of in-tank system, but is also useful for rotating machines such as motors, generators and dynamos in a variety of fields.

What is claimed is:

1. A commutator comprising:

a coil, a plurality of carbon segments, wherein the carbon segments are insulated from each other, a plurality of conductive members, wherein the conductive members are insulated from each other and the coil is connected to the conductive members, wherein a brazing material comprising nickel and chromium joins the carbon segments to the conductive members and the brazing material directly contacts at least the conductive members and a substrate supporting the carbon segments and the conductive members.

2. A commutator as in claim 1, wherein the difference in thermal expansion coefficients between the brazing material and the carbon segments is less than the difference in thermal expansion coefficients between carbon segments and the conductive members.

3. A commutator as in claim 1, wherein the conductive members comprise claws and the claws are joined to the carbon segments by the brazing material.

4. A commutator as in claim 1, wherein the coil and the conductive members are formed of copper.

5. A commutator as in claim 1, wherein the carbon segments have a melting temperature that is higher than the melting temperature of the brazing material.

6. A commutator as in claim 1, wherein the brazing material directly contacts both the carbon segments and the conductive members.

7. A commutator as in claim 1, wherein chrome carbide is formed at the interface of the brazing material and the carbon segments.

8. A commutator as in claim 1, wherein the brazing material comprises JIS Z 3265 BNi-7.

9. A commutator as in claim 1, wherein the carbon segments have a property of resisting corrosion when contacting a mixed fuel system containing alcohol.

10. A commutator as in claim 1, wherein the conductive members comprise a first sets of claws and a second set of claws, the first and second set of claws being disposed in substantially parallel planes and projecting radially inwardly and wherein the first set of claws contacts the brazing material and the substrate and the second set of claws are embedded within the substrate and provide support for the substrate.

11. A commutator as in claim 1, wherein the carbon members substantially comprise compression molded carbon powder.

12. A commutator as in claim 1, wherein the conductive members comprise integrally molded hooks that are connected to the coil.

13. A commutator as in claim 1, wherein the substrate is formed of resin, the conductive members further comprise integrally formed retaining members, which retaining members retain the resin substrate, and the carbon segments comprise a stepped portion that anchors the resin substrate.

14. A commutator as in claim 1, wherein the carbon segments have a bending strength of at least 200 kg/cm$^2$.

15. A commutator as in claim 1, wherein the difference in thermal expansion coefficients between the brazing material and the carbon segments is less than the difference in thermal expansion coefficients between the carbon segments and the conductive members, the conductive members comprise claws and the claws are joined to the carbon segments by the brazing material, the carbon segments have a firing temperature that is higher than the melting temperature of the brazing material and the brazing material directly contacts both the carbon segments and the conductive members.

16. A commutator as in claim 15, wherein the conductive members comprise integrally molded hooks and the hooks are connected to the coil.

17. A commutator as in claim 16, wherein the substrate comprises resin, the conductive members further comprise integrally formed retaining members, which retaining members retain the resin substrate, and the carbon segments comprise a stepped portion that anchors the resin substrate.

18. A commutator as in claim 17, wherein the carbon segments consist essentially of compression molded carbon powder and have a bending strength of at least 200 kg/cm$^2$.

19. A commutator as in claim 18, wherein the carbon segments have a property of resisting corrosion when contacting a mixed fuel system containing alcohol.

20. A commutator as in claim 19, wherein the brazing By material comprises a mixture of nickel and chromium and chrome carbide is formed at the interface of the brazing material and the carbon segments.

21. A commutator as in claim 20, wherein the brazing material comprises JIS Z 3265 BNi-7.

22. A commutator comprising:

a coil, a plurality of carbon segments, wherein the carbon segments are insulated from each other, a plurality of conductive members, wherein the conductive members are insulated from each other and the coil is connected to the conductive members, wherein the carbon segments are joined to the conductive members by a brazing material comprising a mixture of nickel and chromium, the brazing material directly contacting at least the conductive members and a substrate supporting the carbon segments and the conductive members.

23. A commutator as in claim 22, wherein the carbon segments have a bending strength of at least 200 kg/cm$^2$.

24. A commutator as in claim 22, wherein the conductive members comprise claws and the claws are joined to the carbon segments by the brazing material.

25. A commutator as in claim 22, wherein the carbon segments have a firing temperature that is higher than the melting temperature of the brazing material.

26. A commutator as in claim 22, wherein the brazing material directly contacts both the carbon segments and the conductive members.

27. A commutator as in claim 22, wherein the conductive members comprise integrally molded hooks that are connected to the coil.

28. A commutator as in claim 22, wherein the substrate comprises resin, the conductive members further comprise integrally formed retaining members, which retaining members retain the resin substrate and the carbon segments comprise a stepped portion that anchors the resin substrate.

29. A commutator as in claim 22, wherein the coil and the conductive members comprise copper.

30. A commutator as in claim 22, wherein chrome carbide is formed at the interface of the brazing material and the carbon segments.

31. A commutator as in claim 22, wherein the brazing material comprises JIS Z 3265 BNi-7.

32. A commutator as in claim 22, wherein the carbon segments have a property of resisting corrosion when contacting a mixed fuel system containing alcohol.

33. A commutator as in claim 22, wherein the conductive members comprise a first set of claws and a second set of claws, the first and second sets of claws being disposed in substantially parallel planes and projecting radially inwardly, the first set of claws contacting the brazing material and the substrate and the second set of claws being embedded within the substrate and providing support for the substrate.

34. A commutator as in claim 22, wherein the carbon members substantially comprise compression molded carbon powder.

* * * * *